(12) United States Patent
Xiang et al.

(10) Patent No.: US 11,977,201 B2
(45) Date of Patent: May 7, 2024

(54) INTEGRATED DETECTION METHOD OF ELECTROMAGNETIC SEARCHING, LOCATING AND TRACKING FOR SUBSEA CABLES

(71) Applicant: HUAZHONG UNIVERSITY OF SCIENCE AND TECHNOLOGY, Hubei (CN)

(72) Inventors: Xianbo Xiang, Hubei (CN); Jialei Zhang, Hubei (CN); Shaolong Yang, Hubei (CN); Qin Zhang, Hubei (CN); Gong Xiang, Hubei (CN); Guohua Xu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 202 days.

(21) Appl. No.: 17/837,059

(22) Filed: Jun. 10, 2022

(65) Prior Publication Data
US 2022/0397694 A1 Dec. 15, 2022

(30) Foreign Application Priority Data
Jun. 12, 2021 (CN) .......................... 202110657419.4

(51) Int. Cl.
*G01V 3/165* (2006.01)
*B63G 8/00* (2006.01)
*B63G 8/38* (2006.01)

(52) U.S. Cl.
CPC ............ *G01V 3/165* (2013.01); *B63G 8/001* (2013.01); *B63G 8/38* (2013.01); *B63G 2008/004* (2013.01)

(58) Field of Classification Search
CPC . G01V 3/165; G01V 3/15; G01V 3/08; B63G 8/001; B63G 8/38; B63G 2008/004
See application file for complete search history.

(56) References Cited

U.S. PATENT DOCUMENTS

| 5,764,061 A | * | 6/1998 | Asakawa | ................. | G01V 3/02 324/365 |
| 7,336,078 B1 | * | 2/2008 | Merewether | ............. | G01V 3/15 324/67 |
| 2005/0062475 A1 | | 3/2005 | Nakanishi et al. | | |

FOREIGN PATENT DOCUMENTS

| CN | 108045530 | 5/2018 |
| CN | 109625220 | 4/2019 |

(Continued)

OTHER PUBLICATIONS

Zemin Niu, The Research of Automatic Tracking Technology of Submarine Cable Based on Magnetic Signal, Thesis of Master Degree, Huazhong University of Science & Technology, May 2016, pp. 1-79.

(Continued)

*Primary Examiner* — Anthony D Wiest
(74) *Attorney, Agent, or Firm* — JCIPRNET

(57) ABSTRACT

The invention discloses an integrated detection method of electromagnetic searching, locating and tracking for subsea cables. After being launched into water, the cable-tracking AUV carries out primary Z-shaped reciprocating sailing to search the electromagnetic signal of the target subsea cable, when the electromagnetic signal reaches a preset threshold value, the AUV executes the cable-tracking detection. In the tracking process, if the target electromagnetic signal intensity is lower than the preset threshold, it is determined that subsea cable tracking is lost. At this time, the secondary Z-shaped cable-researching route planning and tracking are performed based on the lost point. In the process that the AUV autonomously tracks and detects the subsea cable, relative locating between AUV and subsea cable is performed based on the electromagnetic signal radiated by the subsea cable, and autonomous tracking control under the (Continued)

guidance of the electromagnetic locating signal is performed.

6 Claims, 3 Drawing Sheets

(56) References Cited

FOREIGN PATENT DOCUMENTS

| | | |
|---|---|---|
| CN | 112478108 | 3/2021 |
| CN | 112560207 | 3/2021 |
| CN | 112835107 | 5/2021 |
| JP | 2017044510 | 3/2017 |

OTHER PUBLICATIONS

Caoyang Yu, et al., "Robust Magnetic Tracking of Subsea Cable by AUV in the Presence of Sensor Noise and Ocean Currents," IEEE Journal of Oceanic Engineering, vol. 43, No. 2, Apr. 2018, pp. 311-322.

Ming-Zhong Yan, et al., "Application of Mini ROV in Search for Underwater Targets in an Unknown Local Underwater Environment," SHIP & Ocean Engineering, vol. 41, No. 2, Apr. 2012, pp. 174-177.

* cited by examiner

INTEGRATED DETECTION METHOD OF ELECTROMAGNETIC SEARCHING, LOCATING AND TRACKING FOR SUBSEA CABLES

CROSS-REFERENCE TO RELATED APPLICATION

This application claims the priority benefit of China application serial no. 202110657419.4, filed on Jun. 12, 2021. The entirety of the above-mentioned patent application is hereby incorporated by reference herein and made a part of this specification.

BACKGROUND

Technology Field

The invention relates to the technical field of marine engineering, and more specifically, to the field of operation and maintenance of subsea cables.

Description of Related Art

Subsea cables include, subsea optical cables, and subsea optoelectronic composite cables. Subsea optical cable communication has become one of the most important means of international communication due to its advantages such as large capacity, high quality, low price. The subsea optical cable communication accounts for 95% or more of the international data traffic in the world. With the rapid development of Internet-related services such as 5G and cloud services, the demand for data communication has an explosive growth, and the demand for the bandwidth and the quantity of subsea optical cables has increased rapidly as well. Subsea cables play a huge role in power transmission fields such as ocean wind power generation and power transmission between islands. Subsea cables are often disturbed by natural and human factors such as tsunamis, earthquakes, and anchoring and are often in abnormal operating conditions such as damage, fracture, and suspension. For example, on Feb. 27, 2004, in the subsea cable protection area near the Shantou landing station of the international subsea optical cable, an illegal operation of a dredger resulted in failure of the Asia-Europe international subsea optical cable and a communication interruption for more than 10 days. Therefore, accurate detection of subsea cable routing and daily tracking inspection are important tasks in the daily maintenance of subsea cables. Subsea cables, especially in the offshore area, are mostly buried on the seabed, so as to minimize the risks brought by natural and human factors to the operation of the subsea cable system. Subsea cables, especially subsea optical cables with small diameters, and the buried state on the seabed make it difficult for conventional underwater acoustic and optical detection equipment to accurately locate the cable's routing information. The underwater electromagnetic detection technology provides new solutions for the detection of small-diameter buried subsea cables.

Currently, for the subsea cable detecting tasks in engineering practice, remotely operated vehicles (ROV) carrying electromagnetic detection sensors are extensively used, and the surface research vessel is used for the release and the recovery of the ROV. For underwater operations, a vessel is first anchored, then a professional navigator operates the ROV to dive into the water to search the target electromagnetic signals. With the detected real time electromagnetic signals fed back to the host computer on the research vessel, the navigator may make decisions and remotely control the ROV. When the target electromagnetic signal of the subsea cable is searched, the ROV will be manipulated in the direction with the larger electromagnetic signal according to the directivity of the vectorial electromagnetic signal.

The subsea cable electromagnetic detection method used in the foregoing current projects is basically centered on the navigator of the research vessel and greatly depends on the practical experience in engineering of the navigator. The detection operation is highly dependent on the research vessel and the navigator. The level of operation autonomy and operation efficiency are low. Moreover, sea states for operation are highly required due to the dependence on the vessel on the sea.

SUMMARY

The purpose of the invention is to provide a complete set of integrated detection method of electromagnetic searching, locating and tracking for subsea cables. The invention considers a series of actual working conditions and tasks of the subsea cable detection using autonomous underwater vehicle (AUV), including launching the AUV into the water, searching the electromagnetic signal of the subsea cable, tracking the subsea cable, and re-searching after the electromagnetic signal is lost. The invention aims to complete the tracking, detecting, and locating under real sea conditions and subsea cable routing conditions. The invention provides a complete set of operation procedures and solutions that conform to marine engineering practice and have a relatively high degree of intelligence for tracking and detecting the subsea cables.

In order to achieve the aims, the technical solutions adopted in the invention include contents as follows.

The inputs of the planning and control process algorithm of the electromagnetic searching-locating-tracking integrated detection for the subsea cable are as follows: the latitude and longitude of the waypoint 1 $O_1(N_1, E_1)$, the latitude and longitude of the waypoint 2 $O_2(N_2, E_2)$, a detection sailing time threshold ($t_{tol,sum}$), a detection sailing distance threshold ($d_{tol,sum}$), an electromagnetic signal threshold ($B_{val}$), a target waypoint receiving circle threshold ($d_{acp}$), the primary Z-shaped searching route length ($L_1$), a Z-shaped searching route angle ($\theta_1$) a primary maximum allowable searching range ($d_{alo,1}$), a secondary maximum allowable searching range ($d_{alo,2}$), the secondary Z-shaped searching route length ($L_2$), and a Z-shaped searching route angle ($\theta_2$).

The principle of selecting relevant parameters in the process of integrated detection is presented as follows. When the waypoint 1 and the waypoint 2 are set in the host computer, two waypoints $O_1$ and $O_2$ should be ensured to be located on two sides of the subsea cable respectively according to the approximate route and the direction of the subsea cable, and that their connection lines are basically perpendicular to a cable direction. The detection sailing time threshold and detection sailing distance threshold are the total time and the total distance of the overall detection task respectively. And the distance should be ensured that $d_{tol,sum} > d_{alo,1} > d_{alo,2}$. Similarly, in the processes of the primary searching and the secondary searching for the electromagnetic signal, the limit of the searching time can be selected. The target waypoint receiving circle threshold $d_{acp}$ indicates that when the distance between the AUV and the target waypoint is less than the value of $d_{acp}$, AUV managed to search the target waypoint, and the selection of the value for $d_{acp}$ should be performed according to the maneuverability and the tracking performance of the AUV. Generally, the value is recommended to be taken from the range of 10-15 meters. For the Z-shaped sailing search route planning, the process of the primary searching generally has higher uncertainty compared to the secondary re-searching, so when selecting the parameters, it should be ensured that $L_1 > L_2$, $\theta_1$, $\theta_2 \approx 150°$.

Process of the Primary Searching for the Electromagnetic Signal of the Subsea Cable in the Wide Range is as Follows.

Determine whether the electromagnetic signal intensity fed back by an electromagnetic detection sensor carried by the AUV exceeds the preset threshold or not and whether the tracking flag is 0 or not. The electromagnetic signal intensity ($B_{val}$) is determined through experiments to ensure that after detecting that the electromagnetic signal intensity exceeds the preset threshold ($B_{val}$), the AUV is within the effective sensing region around the subsea cable, so that the detecting, locating, and tracking of the subsea cable can be performed based on the effective electromagnetic signal. When the electromagnetic signal intensity is less than $B_{val}$ and the tracking flag is 0, it indicates that the AUV has not detected the effective electromagnetic signal of the subsea cable since it is launched in the water, and the primary searching process in the wide range and control process are performed; when it is detected that the electromagnetic signal intensity exceeds $B_{val}$, or the tracking flag is set to 1, the primary searching process is terminated and then the AUV enters the cable tracking process or the secondary searching process. Next, the electromagnetic signal intensity is re-compared. When the detected electromagnetic signal intensity exceeds $B_{val}$, then the AUV enters the locating and tracking detection processes. When the detected electromagnetic signal intensity is less than $B_{val}$, it indicates that the effective sensing region had been reached or the locating and tracking detection of the subsea cable had been implemented, then the secondary searching for the electromagnetic signal of the subsea cable is performed.

In the process of the primary searching in the wide range, first the distance between the current location of the AUV and the target waypoint on the straight route (the waypoint 1 $O_1(N_1, E_1)$ which is planned in the initial stage) is calculated. When the distance between the AUV and the waypoint $O_1(N_1, E_1)$ is greater than the preset receiving circle threshold ($d_{acp}$), it is determined that the AUV has not yet reached the vicinity of the waypoint, and continues to perform a searching task with fixed-height and fixed-direction. When the distance between the AUV and the waypoint is less than the preset receiving circle threshold, it is determined that the AUV has reached the vicinity of the waypoint, and the next searching route is planned and tracked. When planning the next searching route, the current location of the AUV is taken as the initial point of the straight searching route. When the target waypoint is the preset route waypoint 1 (when the distance between the launching location of the AUV and the preset route waypoint 1 is greater than the receiving circle threshold, the AUV may first sail to the vicinity of the preset route waypoint 1, and then start to perform the sailing search and the detecting task), then the preset waypoint 2 is used as the new target waypoint on the next straight searching route; when the target waypoint is not the preset waypoint 1, then the target waypoint on the straight searching route is planned with a Z-shaped sailing method.

The planning manner for the Z-shaped sailing method is as follows. The Z-shaped searching route with the preset route length $L_1$ and route angle $\theta_1$ are set by the host computer.

The target waypoint on the Z-shaped searching route is planned as follows:

$$O_{i+1} = (N_{O_i} + L_1 \cos(\psi \pm \theta_1), E_{O_i} + L_1 \sin \psi \pm \theta_1),$$

wherein ($N_{O_i}$, $E_{O_i}$) are the coordinates of the current location of the AUV, and $\psi$ is an angle of the route where the AUV is located currently. The formula represents that when AUV reaches the target waypoint, the AUV changes the heading angle to the right (+) and to the left (−) alternately.

Process of the Secondary Searching in the Local Small Range after the Electromagnetic Signal of the Subsea Cable is Lost is as Follows.

In the process of tracking detection for the subsea cable, when the detected electromagnetic signal intensity is lower than the preset threshold due to factors, such as electromagnetic signal interference, subsea cable failure, and the like, then the secondary searching task is activated. When the AUV enters the secondary searching process for the first time, a cable lost flag is 0, and subsea cable information at lost location is recorded, such as the current location of the AUV and the located subsea cable routing angle and the water depth, then the cable tracking lost flag will be set as 1. When the AUV enters the secondary searching process repeatedly, the location of the previous lost point is maintained since the cable tracking lost flag is set as 1.

The latitude and longitude coordinates of the lost point are converted to XY profiles coordinates. The distance between the AUV and the lost point of the subsea cable is calculated. Whether the distance between the AUV and the lost point exceeds the preset secondary maximum allowable searching range ($d_{alo,2}$) is judged. When the distance exceeds $d_{alo,2}$, it is determined that the subsea cable tracking is lost, and the current cable tracking and detection task is terminated; when the distance from the lost point is less than $d_{alo,2}$, the secondary searching in the local small range based on the lost point is performed. The secondary searching process adopts the Z-shaped sailing, and its basic principle is the same as that of the primary searching in the wide range, except that the Z-shaped searching route length L in the secondary searching is smaller than the same of that in the primary searching process, and the Z-shaped route angle $\theta$ in the secondary searching is larger than the same of that in the primary searching process, so that the secondary searching is performed only within the local small range.

A Control Algorithm Based on the Electromagnetic Tracking of the Subsea Cable is as Follows.

In the effective sensing region of the electromagnetic signal, through the electromagnetic detection sensor carried by the AUV, the AUV can detect the heading deviation $\psi_e$, detect, lateral offset $Y_e$ in the horizontal profiles, and vertical offset $Z_e$ in the vertical profile between the AUV and the subsea cable, and the AUV can further perform the tracking detection of the subsea cable based on the detected results.

The guidance law for the AUV to track the subsea cable in the horizontal and vertical profiles based on the electromagnetic locating result of the subsea cable is designed as follows:

$$\begin{cases} \psi_{LOS} = \tan^{-1}\left(\dfrac{-Y_e}{k_y l}\right) \\ \theta_{LOS} = \tan^{-1}\left(\dfrac{Z - Z_d}{k_z l}\right) \end{cases},$$

wherein $Y_e$ is the lateral offset between the AUV and the subsea cable, Z is the vertical height of the AUV related to seabed which is measured with AUV-boarded altimeter in real-time, $Z_d$ is the expected tracking height above the seabed, l is the length of the AUV, $k_y$ and $k_z$ are guidance constants.

Based on the guidance law in the horizontal and vertical profiles, the deviation of the heading angle and the pitch angle of the AUV is designed as follows:

$$\begin{cases} \psi_e = \psi_{e,detect} + \beta + \psi \\ \theta_e = \theta - \alpha \end{cases},$$

where $\psi_{e,det\ ect}$ is the detected angle between the AUV heading and the subsea cable, $\psi$ and $\theta$ are the heading angle and the pitch angle of the AUV, respectively, and the sideslip angle $\beta$ and the angle of attack $\alpha$ are expressed as follows:

$$\begin{cases} \beta = \tan^{-1}\left(\frac{v}{u}\right) \\ \alpha = \tan^{-1}\left(\frac{-w}{u}\right) \end{cases},$$

wherein u, v, and w are surge speed, sway speed and heave speed of the AUV respectively; with above locating results and guidance laws, a backstepping motion controller for AUV in horizontal and vertical profiles are designed as follows:

$$\begin{cases} \tau_r = -(m_{11} - m_{22})uv + d_{66}r + m_{66}\left(K_{pr}e_r + K_{ir}\int_0^t e_r d\tau + K_{dr}\dot{e}_r\right) \\ \tau_q = -(m_{33} - m_{11})uw + d_{55}q + m_{55}\left(K_{pq}e_q + K_{iq}\int_0^t e_q d\tau + K_{dq}\dot{e}_q\right) \end{cases},$$

wherein $m_{11}$, $m_{22}$, $m_{33}$, $m_{55}$, and $m_{66}$ are the hydrodynamic parameters of the AUV in surge, sway, heave, pitch and yaw directions respectively; $d_{55}$ and $d_{66}$ are the hydrodynamic damping parameters of the AUV in pitch and yaw directions respectively; $K_{pr}$, $K_{ir}$, $K_{dr}$ and $K_{pq}$, $K_{iq}$, $K_{dq}$ are the motion control parameters of the AUV on the horizontal and vertical profiles, respectively; $\tau_r$ and $\tau_q$ are control inputs in horizontal and vertical profiles respectively. The control errors $e_r$ and $e_q$ of the yaw and pitch directions are expressed as follows.

$$\begin{cases} e_r = r - r_d \\ e_q = q - q_d \end{cases},$$

wherein r and q are real-time yaw and pitch angular speeds respectively, $r_d$ and $q_d$ are desired yaw and pitch angular speeds respectively, which are designed as follows.

$$\begin{cases} r_d = \dot{\psi}_{LOS} - k_\psi(\psi_e - \psi_{LOS}) - UY_e \frac{\sin\psi_e - \sin\psi_{LOS}}{\psi_e - \psi_{LOS}} - \dot{\beta} \\ q_d = \dot{\theta}_{LOS} - k_\theta(\theta_e - \theta_{LOS}) - U(Z - Z_d)\frac{\sin\theta_e - \sin\theta_{LOS}}{\theta_e - \theta_{LOS}} - \dot{\alpha} \end{cases},$$

where U is the resultant speed of the AUV; $k_\psi$ and $k_\theta$ are non-negative control parameters. It is noted that the foregoing is merely the design of the backstepping controller based on the locating result of the subsea cable, and various control algorithms such as algorithm of the electromagnetic locating results and magnetic guidance laws, sliding mode control algorithm, are applicable.

Control of Time and Distance of Continuous Sailing and Detecting has the Followings.

In each control cycle, first the sailing distance between current position and launching location of the AUV is calculated, and total sailing time after being launched into the water is calculated, the total sailing time and sailing distance of all processes, such as searching for signals from the subsea cable, tracking and detecting, and secondary searching, are constrained to ensure that the AUV completes cable detection tasks and rises up to surfaces within a limited time. Constrain the sailing distance and sailing time of the primary and secondary searching process, so that the AUV performs cable searching task in a limited period of time to prevent the AUV from sailing and searching for a long time without the electromagnetic signal of the subsea cable, and even avoid the loss of AUV.

The beneficial effects of the invention are as follows.

1. The integrated detection method of subsea cable electromagnetic searching, locating and tracking designed by the invention can achieve the autonomous subsea cable searching and motion control of the AUV starting from being launched into the water to the completion of the whole process of detecting task. The detection process does not require human intervention in decision-making and control, so that the subsea cable detection AUV equipment has a high level of autonomy, and reduce the dependence on the vessel, professional operators and other auxiliary conditions, thus, there are more advantages in terms of economy and environmental protection.

2. Through multiple constraints on the AUV's sailing time and sailing distance in the process of subsea cable detection, such as the total sailing distance, the primary searching distance, and the secondary searching distance, the searching-detection-tracking task can be terminated when specific time and distance trigger conditions are met. By combining the design of multiple task state flags, it ensures that the AUV will not enter the planning dead loop during underwater detection and searching, further ensuring the safety of the AUV navigation and detection.

3. The designed integrated planning process includes the process of secondary searching in the vicinity of a local area based on the lost point information after the electromagnetic signal of the subsea cable is lost in the subsea cable tracking process, and through the secondary searching, the cable tracking task is continuously performed, which improves the robustness of the subsea cable detection system and further ensures that the AUV performs continuous long-range electromagnetic detection of the subsea cable.

DESCRIPTION OF THE EMBODIMENTS

In order to make the objectives, technical solutions, and advantages of the invention clearer, embodiments accompanied with drawings are described to illustrate the invention in detail below.

Figure 1:
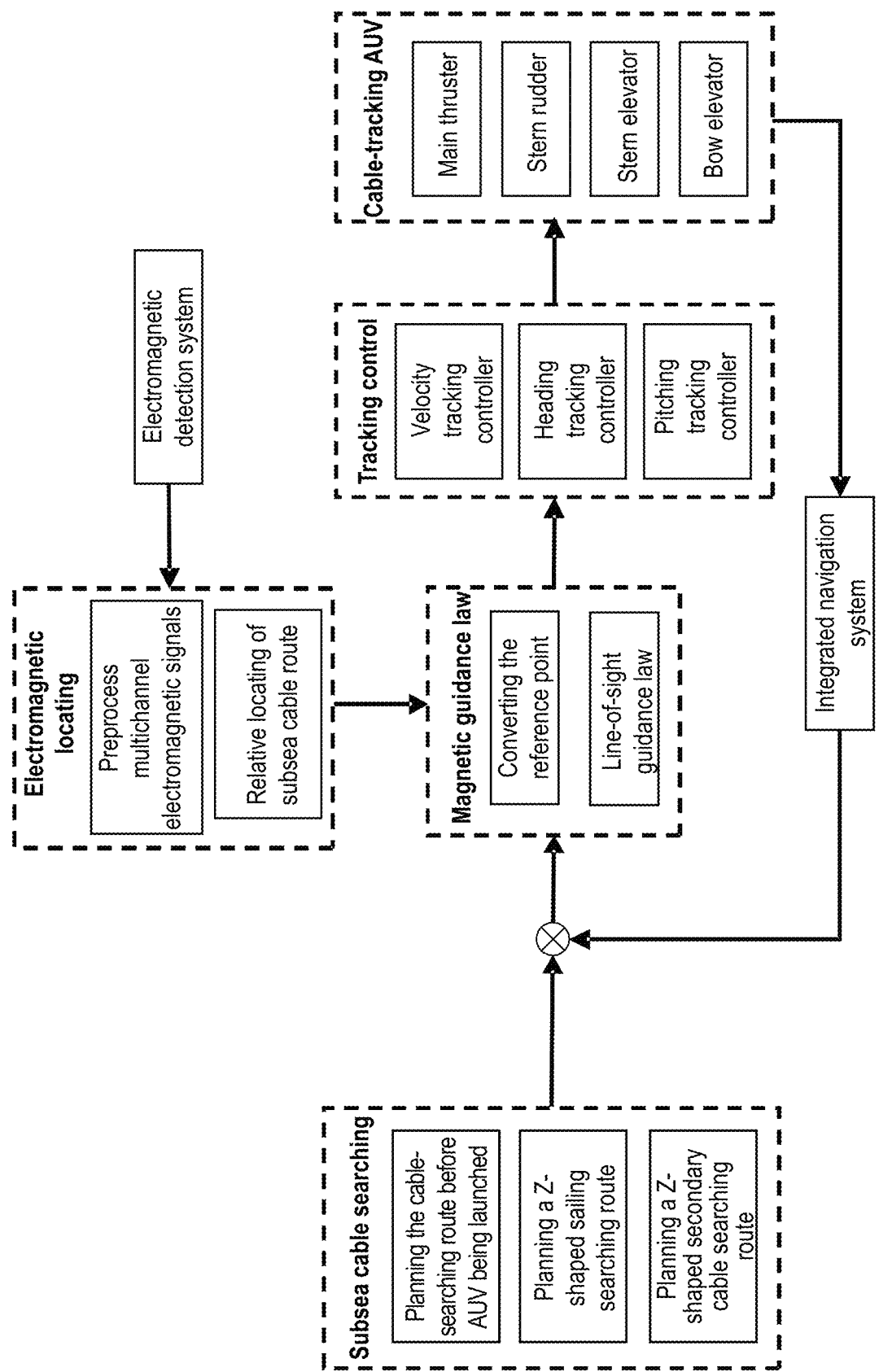
FIG. 1 is a schematic view of a subsea cable electromagnetic searching-locating-tracking integration.

As an embodiment of the invention, FIG. 1 illustrates a schematic view of a subsea cable electromagnetic searching-locating-tracking integration based on an AUV, and the relationship among subsea cable searching, electromagnetic locating, and tracking control is clearly illustrated. Through the designed magnetic guidance law based on the electromagnetic locating results of the subsea cable, the coupling between the subsea cable locating system and the autonomous tracking control system of the AUV is implemented.

Figure 3:
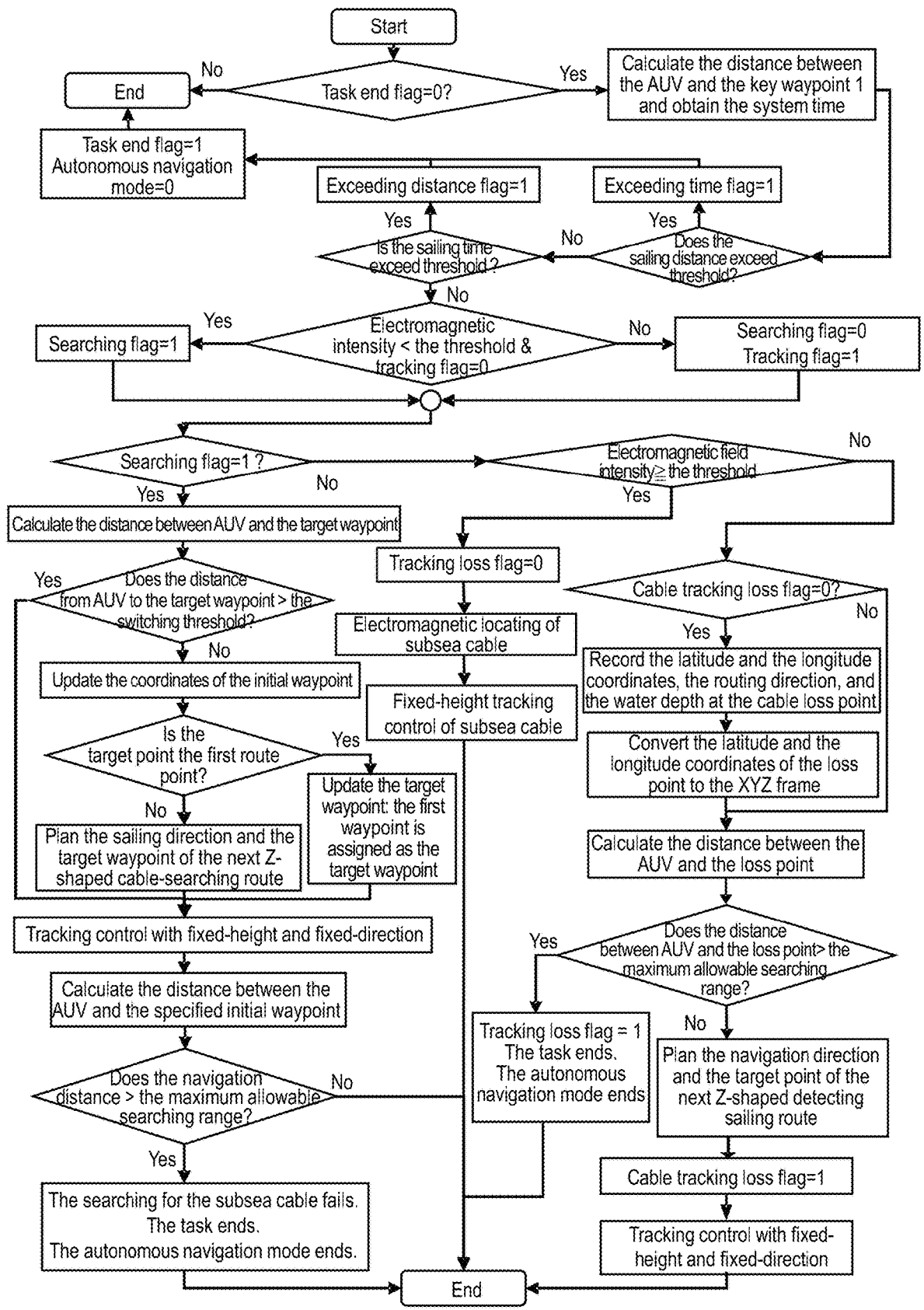
FIG. 3 is a flowchart illustrating a subsea cable electromagnetic searching-locating-tracking integration.

The process of a subsea cable electromagnetic signal searching-locating-tracking integration is illustrated as shown in FIG. 3 which is also a block diagram of the planning and control process of the autonomous subsea cable detection. The inputs of the planning algorithm includes the latitude and longitude of the waypoint 1 $O_1$ ($N_1$, $E_1$), the latitude and longitude of the waypoint 2 $O_2$ ($N_2$, $E_2$), a detection sailing time threshold ($t_{tol,sum}$), a detection sailing distance threshold ($d_{tol,sum}$), an electromagnetic signal threshold ($B_{val}$), a target waypoint receiving circle threshold ($d_{acp}$), the primary Z-shaped searching route length ($L_1$), a Z-shaped searching route angle ($\theta_1$), a primary maximum allowable searching range ($d_{alo,1}$), a secondary maximum allowable searching range ($d_{alo,2}$), the secondary Z-shaped searching route length ($L_2$), and a Z-shaped searching route angle ($O_2$).

In the process of selecting parameters, when the waypoint 1 and the waypoint 2 are set in the host computer, two waypoints $O_1$ and $O_2$ should be ensured to be located on two sides of the subsea cable respectively according to the approximate route and the direction of the subsea cable, and that the connection lines between $O_1$ and $O_2$ are almost perpendicular to the subsea cable direction. The detection sailing time threshold and detection sailing distance threshold are the total time and the total distance of the overall detection task respectively, and the distance should be ensured that $d_{tol,sum} > d_{alo,1} > d_{alo,2}$ to ensure the effectiveness of the primary, subsea cable searching. Similarly, in the processes of the primary searching and the secondary searching, the limits of the search time can be selected. The target waypoint receiving circle threshold $d_{acp}$ indicates that when the distance between the AUV and the target waypoint is less than the value, it is realized that the AUV has reached the target waypoint, and the value should be selected according to the maneuverability and the tracking performance of the AUV. Generally, the value of $d_{acp}$ is recommended to be taken from the range of 10-15 meters. For the Z-shaped subsea cable searching route planning, the process of the primary searching generally has higher uncertainty compared to the secondary researching, hence it should be ensured that $L_1 > L_2$, $\theta_1$, $\theta_2$, $\theta_2 \approx 150°$.

Figure 2:
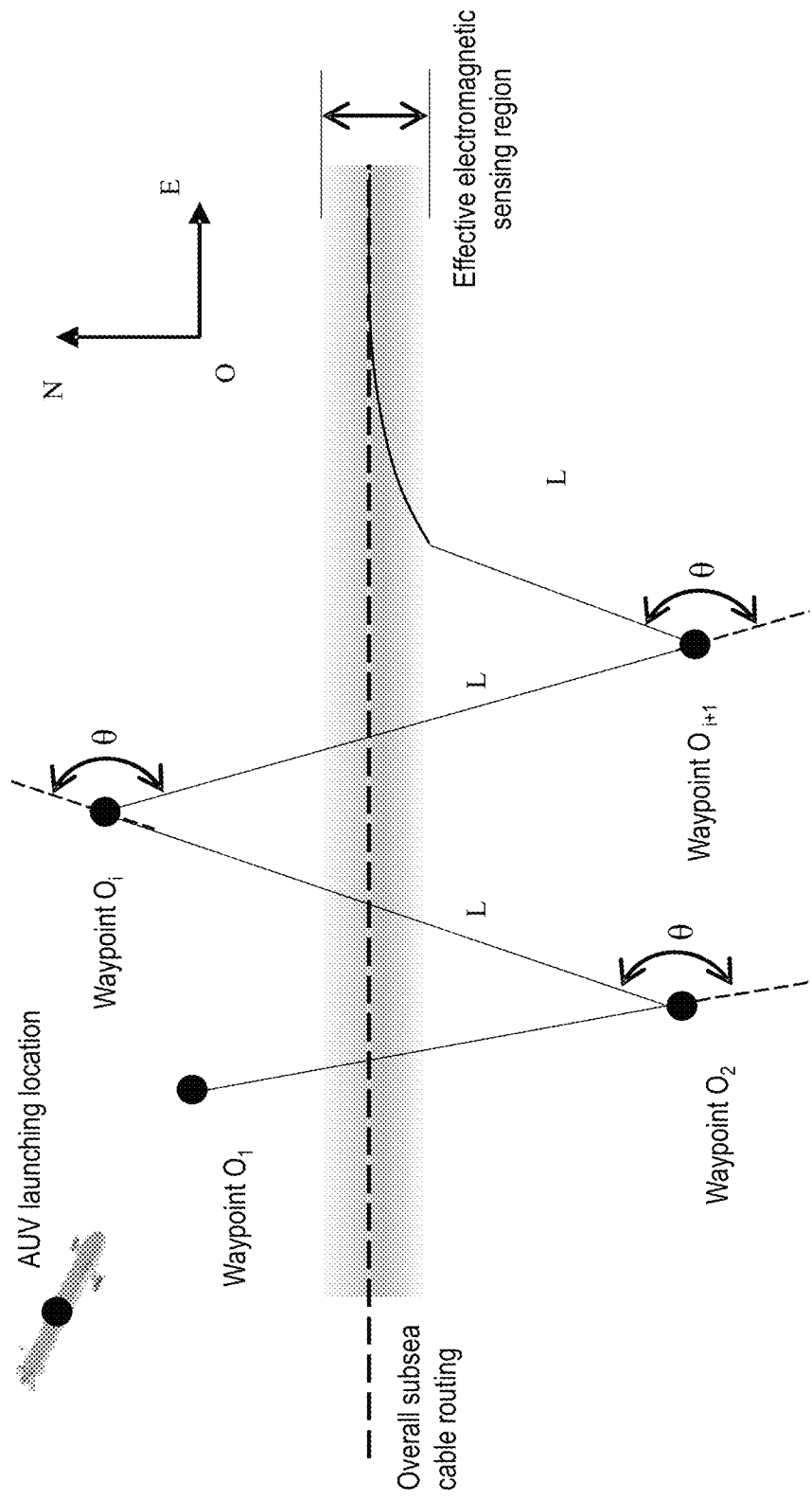
FIG. 2 is a schematic view of the planned subsea cable electromagnetic signal search process in a Z-shaped route.

The latitude and longitude of the two waypoints are set by the host computer, which are the first waypoint $O_1$ and the second waypoint $O_2$ respectively, as shown in FIG. 2. The AUV is launched near the first waypoint $O_1$, the latitude and longitude coordinates together with the AUV system time (refer to as $t_0$) at the launching location are recorded.

After the launching of the AUV, autonomous planning and sailing detection are performed according to the control cycle of the AUV. The flow chart in each control cycle is as follows:

(1) First, the latitude and longitude coordinates of the AUV are converted to the XYZ coordinate system, and the distance (refer to as $d_{n0}$) between the AUV and the specified first waypoint $O_1$ is calculated. The time difference (refer to as $t_{n0}$) between the current time of the AUV system and the initial time to is calculated, and whether the actual sailing distance ($d_{n0}$) and sailing time ($t_{n0}$) of the AUV exceeds a preset threshold is determined. When the corresponding threshold is exceeded, the AUV may float up and the detecting task is finished; when the actual sailing distance ($d_{n0}$) and sailing time ($t_{n0}$) of the AUV remain within the preset threshold, the subsea cable searching and tracking task continue.

(2) Whether the electromagnetic signal intensity fed back by the electromagnetic detection sensor carried by the AUV exceeds a preset threshold ($B_{val}$) or not and whether the tracking flag is 0 or not are both determined. As shown in FIG. 2, within a certain range around the subsea cable, the electromagnetic signal intensity of the laid subsea cable is relatively high. The threshold of the electromagnetic signal intensity can be determined through experiments to ensure that after detecting that the electromagnetic signal intensity exceeds the preset threshold, the AUV is within the effective sensing region around the subsea cable, so that the detecting, locating, and tracking of the subsea cable can be performed based on the effective electromagnetic signal. When the electromagnetic signal intensity is less than the preset threshold and the tracking flag is 0, it indicates that the AUV has not detected the effective electromagnetic signal of the subsea cable since it is launched in the water, and the primary searching process in the wide range and control process are performed; when it is detected that the electromagnetic signal intensity exceeds the preset threshold ($B_{val}$), or the tracking flag is set to 1, the primary searching process is terminated and the AUV enters the tracking detection or the secondary searching process after the loss of the electromagnetic signal of the subsea cable, and then the electromagnetic signal intensity is re-compared. When the detected electromagnetic signal intensity exceeds the preset threshold $B_{val}$, the locating and tracking detection of the subsea cable is performed; when the detected electromagnetic signal intensity is less than the preset threshold $B_{val}$, it indicates that the effective sensing region had been reached or the locating and tracking detection of the subsea cable had been implemented, then the secondary searching for the electromagnetic signal of the subsea cable is performed.

(3) In the process of the primary searching in the wide range, first the distance between the current location of the AUV and the target waypoint on the straight searching route (the first waypoint $O_1$ is first set to serve as the target waypoint when the task is initialized) is calculated. When the distance between the AUV and the target waypoint is greater than the preset receiving circle threshold ($d_{acp}$), it is determined that the AUV has not yet reached the vicinity of the target waypoint, and continues to perform searching task with fixed-height and fixed-direction. When the distance between the AUV and the target waypoint is less than the preset receiving circle threshold ($d_{acp}$), it is determined that the AUV has reached the vicinity of the target waypoint and the next searching route is planned and tracked. When planning the next search route, first the current location of the AUV is taken as the initial point of the straight searching route and whether the target waypoint of the original straight searching route is the preset first waypoint $O_1$ or not is determined. When the target waypoint is the preset first waypoint $O_1$ (when the distance between the launching location of the AUV is launched in the water and the preset first waypoint is greater than $d_{acp}$, the AUV may first sail to the vicinity of the first waypoint $O_1$, and then start to perform the sailing search and the detecting task), then the second waypoint $O_2$ is regarded as the target waypoint of the next straight searching route; when the target waypoint of the original straight searching route is not the first waypoint $O_1$, the target waypoint on the straight searching route is planned with a Z-shaped sailing method.

(4) The subsea cable searching planning for the Z-shaped sailing method is illustrated as shown in FIG. 2. The Z-shaped searching route with the preset route length $L_1$ and route angle $\theta_1$ are set by the host computer. The target waypoint on the Z-shaped searching route is planned as follows:

$$O_{i+1}=(N_{O_i}+L_1 \cos(\psi \pm \theta_1), E_{O_i}+L_1 \sin \psi \pm \theta_1),$$

wherein ($N_{O_i}$, $E_{O_i}$) are the coordinates of the current location of the AUV, and $\psi$ is an angle of the route where the AUV is located currently. The formula represents that when reaching the target waypoint, the AUV changes the heading angle to the right (+) and to the left (−) alternately.

(5) In the process of the primary searching in the wide range, the distance between the current location of the AUV and the preset first waypoint $O_1$ is calculated. When the sailing distance exceeds the maximum allowable searching range ($d_{alo,1}$), the searching task is terminated, and it is determined that the primary searching for the subsea cable signal fails. When the sailing distance is less than the maximum allowable searching range, the current control cycle task of the AUV is terminated, and the next control cycle is performed repeatedly.

(6) When the electromagnetic signal intensity is greater than the preset electromagnetic signal threshold in the searching process, it is determined that the AUV is within the effective sensing region of the electromagnetic signal of the subsea cable, the cable tracking lost flag of the subsea cable is set 0, and the spatial relative locating of the subsea cable is performed. The relative locating results include the angle between the AUV heading and the subsea cable, the lateral offset and the vertical distance between the AUV and the subsea cable, and the fixed-height tracking detection task of the subsea cable is performed based on the locating results.

(7) Subsea cable locating and tracking control are performed. In the effective sensing region of the electromagnetic signal, through the electromagnetic detection sensor carried by the AUV, the AUV can detect the heading deviation $\psi_{e,detect}$, lateral offset $Y_e$ in the horizontal profile, and vertical offset $Z_e$ in the vertical profile between the AUV and the subsea cable, and the AUV can further perform the tracking detection o of the subsea cable based on the detection results.

The guidance law for the AUV to track the subsea cable in the horizontal and vertical profiles based on the electromagnetic locating result of the subsea cable is designed as follows:

$$\begin{cases} \psi_{LOS} = \tan^{-1}\left(\frac{-Y_e}{k_y l}\right) \\ \theta_{LOS} = \tan^{-1}\left(\frac{Z-Z_d}{k_z l}\right) \end{cases},$$

where $Y_e$ is the lateral offset in the horizontal profile between the AUV and the subsea cable, Z is the vertical height of the AUV related to the seabed which is measured with AUV-boarded altimeter in real-time, $Z_d$ is the expected tracking height above the seabed, l is the length of the AUV, and $k_y$ and $k_z$ are guidance constants.

Based on the formulas for the guidance law in the horizontal and vertical profiles, the deviation of the yaw angle and the pitch angle of the AUV is designed as follows:

$$\begin{cases} \psi_e = \psi_{e,detect} + \beta + \psi \\ \theta_e = \theta - \alpha \end{cases},$$

where $\psi_{e,detect}$ is the detected angle between the AUV heading and the subsea cable, $\psi$ and $\theta$ are the heading angle and the pitch angle of the AUV respectively, and the sideslip angle $\beta$ and the angle of attack $\alpha$ are expressed as follows:

$$\begin{cases} \beta = \tan^{-1}\left(\frac{v}{u}\right) \\ \alpha = \tan^{-1}\left(\frac{-w}{u}\right) \end{cases},$$

where u, v, and w are surge speed, sway speed and heave speed of the AUV respectively. Based on the tracking deviation of the AUV and magnetic guidance law, a backstepping controller is taken as an example, and the motion control of the AUV in horizontal and vertical profiles can be designed as follows:

$$\begin{cases} \tau_r = -(m_{11}-m_{22})uv + d_{66}r + m_{66}\left(K_{pr}e_r + K_{ir}\int_0^t e_r d\tau + K_{dr}\dot{e}_r\right) \\ \tau_q = -(m_{33}-m_{11})uw + d_{55}q + m_{55}\left(K_{pq}e_q + K_{iq}\int_0^t e_q d\tau + K_{dq}\dot{e}_q\right) \end{cases},$$

where $m_{11}$, $m_{22}$, $m_{33}$, $m_{55}$, and $m_{66}$ are the hydrodynamic parameters of the AUV in surge, sway, heave, pitch and yaw directions respectively; $d_{55}$ and $d_{66}$ are the hydrodynamic damping parameters of the AUV in pitch and yaw directions respectively; $K_{pr}$, $K_{ir}$, $K_{dr}$ and $K_{pq}$, $K_{iq}$, $K_{dq}$ are the motion control parameters of the AUV on the horizontal and vertical profiles respectively; $\tau_r$ and $\tau_q$ are control inputs in horizontal and vertical profiles respectively. The control errors $e_r$ and $e_q$ of the heading and pitch degrees are expresses as follows.

$$\begin{cases} e_r = r - r_d \\ e_q = q - q_d \end{cases},$$

where r and q are the real-time yaw and pitch angular speeds respectively, $r_d$ and $q_d$ are the expected yaw and pitch angular speeds respectively, and are designed as follows.

$$\begin{cases} r_d = \dot{\psi}_{LOS} - k_\psi(\psi_e - \psi_{LOS}) - UY_e\frac{\sin\psi_e - \sin\psi_{LOS}}{\psi_e - \psi_{LOS}} - \dot{\beta} \\ q_d = \dot{\theta}_{LOS} - k_\theta(\theta_e - \theta_{LOS}) - U(Z-Z_d)\frac{\sin\theta_e - \sin\theta_{LOS}}{\theta_e - \theta_{LOS}} - \dot{\alpha} \end{cases},$$

where U is the resultant speed of the AUV; $k_\psi$ and $k_\theta$ are non-negative control parameters. Note that the foregoing is merely the design of the backstepping controller based on the locating result of the subsea cable, and various control algorithms are applicable centered on the electromagnetic locating results and magnetic guidance laws.

(8) When the detected electromagnetic signal intensity is lower than the preset threshold due to factors, such as electromagnetic signal interference, subsea cable failure, and the like in the process of tracking detection of the subsea cable, the AUV activates the secondary electromagnetic signal searching task. When AUV enters the secondary searching process for the first time, the cable tracking lost flag is 0, and the AUV records subsea cable information of lost location including the current location of the AUV, a detected subsea cable routing angle and the water depth. Then the cable tracking lost flag will be set as 1. When the AUV enters the secondary searching process repeatedly, the location of the previous lost point is maintained since the subsequent cable tracking lost flag is set to 1.

(9) The latitude and longitude coordinates of the lost point are converted to XY coordinates, and the distance between the AUV and the lost point of the subsea cable is calculated, then whether the distance between the AUV and the lost point exceeds the preset secondary maximum allowable searching range ($d_{alo,2}$) is judged. When the distance exceeds the secondary maximum allowable searching range, it is determined that the subsea cable tracking is lost, and the current cable tracking and detection task is terminated; when the distance between the AUV and the loss point is less than the secondary maximum allowable searching range, the secondary searching in the local small range based on the loss point is performed. The secondary searching process adopts the Z-shaped sailing, and its basic principle is the same as that of the primary searching in the wide range, except that the Z-shaped searching route length L in the secondary searching is smaller than the same of that in the primary searching, and the Z-shaped route angle θ in the secondary searching is larger than the same of that in the primary searching process, so that the secondary searching is performed only within the local small range.

(10) Regarding the conversion of the latitude and the longitude coordinates to XY coordinates, it is performed by the following formula.

$$(x_a, y_a) = \left(2N_0 \sin\frac{N_a - N_0}{2}, 2N_0 \cos\frac{E_a - E_0}{2} \cos E_a\right),$$

$N_0$ is calculated as follows:

$$N_0 = \frac{a}{\sqrt{1 - e^2(\sin E_0)^2}},$$

where ($N_0$, $E_0$) is the latitude and longitude coordinates of the selected origin point. The point where the AUV is launched can be regarded as the origin. ($N_a$, $E_a$) is the latitude and longitude coordinates of the point to be converted. a=6378137.0 m is the long semi-axis of the Earth's ellipsoid. e=0.0818 is the eccentricity of the Earth.

(11) Since the integrated process includes many tasks, it is noted that the process of clearing and setting the relevant flags are required to prevent the flags from being repeatedly used in the search loop or secondary searching loop. Also, when the AUV is launched into the water, all flags are set to 0.

The main working process of the invention is as follows.

Before the AUV is launched, preliminary exploration waypoints are set on two sides of the subsea cable based on the subsea cable laying log.

After being launched in the water, the AUV performs primary Z-shaped reciprocating sailing to search for the electromagnetic signal of the subsea cable. When the electromagnetic signal of the subsea cable is searched, the AUV automatically track and detect under the guidance of the electromagnetic signal. When the preset search time is reached during the primary searching stage and the effective electromagnetic signal of the subsea cable cannot be detected, the primary searching task fails. Then the AUV floats up to the surface and terminates the subsea cable detecting task. In the subsea cable tracking process, if the target electromagnetic signal intensity is lower than a preset threshold value, it is determined that subsea cable is lost, and Z-shaped route planning for the secondary subsea cable searching process and searching path tracking are performed based on the location information at the subsea cable lost point, if the target electromagnetic signal is re-searched within the specified time, then continue to perform the autonomous subsea cable tracking detection task; if the target electromagnetic signal cannot be searched in specified time, the secondary searching task fails, and the AUV floats up to the surface and terminates the detecting task. In the process that the AUV autonomously tracks and detects the subsea cable, relative locating between the AUV and the subsea cable is carried out based on the electromagnetic signal radiated by the subsea cable, and AUV autonomous tracking control under the guidance of the electromagnetic signal is carried out based on the relative locating result.

The electromagnetic signal searching, cable locating and tracking inspection integrated autonomous detection process and method for a subsea cable provided by the invention is a general design scheme and can provide guidance for the AUV to execute the overall design and implementation of the autonomous inspection task of the subsea cable.

Those skilled in the art can easily understand that the foregoing descriptions are only the preferred embodiments of the invention and are not intended to limit the invention. Any modification, equivalent replacement and improvement, and so on made within the spirit and principle of the invention shall be included in the protection scope of the invention.

What is claimed is:

1. An integrated detection method of electromagnetic searching, locating and tracking for subsea cables is an autonomous operation planning and control scheme for an integrated process of a subsea cable searching stage, an electromagnetic locating stage and a tracking detection stage, a subsea cable tracking detection task from launching an autonomous underwater vehicle (AUV) for cable detection to an end is characterized by comprising the following:

a) in the subsea cable searching stage: searching, by the AUV, an electromagnetic signal radiated by a subsea cable around a potential location of the subsea cable on a Z-shaped route in a wide range of water in initial stage; activating processes of electromagnetic locating and tracking detection for subsea cable when sampled electromagnetic signal intensity reaches a preset threshold; in the process of tracking and detection, when the sampled electromagnetic signal intensity is lower than the preset threshold due to electromagnetic interference or subsea cable failure, searching, by the AUV, the electromagnetic signal radiated by the subsea cable again on the Z-shaped route according to information in lost subsea cable;

b) in the electromagnetic locating stage: when an electromagnetic field intensity detected by the AUV exceeds the preset threshold at a preset frequency point, the AUV in effective sensing region near the subsea cable, then performing a relative locating of the subsea cable based on a vectorial electromagnetic signals collected by the AUV, wherein electromagnetic locating information of the subsea cable includes lateral offset, vertical distance, and angle deviation between a AUV heading and the subsea cable;

c) in the tracking detection stage: when the electromagnetic signal intensity does not reach the preset threshold, performing subsea cable searching route tracking control task according to an online planned subsea cable searching route, and collecting the electromagnetic singles in real time; when the electromagnetic signal intensity reaches the preset threshold, carrying out navigation, guidance and control task based on subsea cable locating information, so as to enable the AUV to conduct autonomous tracking and detection along the subsea cable;

d) in integration of subsea cable searching, electromagnetic locating and tracking detection in the whole process: performing a subsea cable searching planning task when the AUV is launched into the water, i.e., completing setting of motion planning parameters; after being launched into the water, steering the AUV to vicinity of a designated planned waypoint and beginning an initial Z-shaped searching for electromagnetic signals in a wide range around the subsea cable; in cable searching process, when the detected electromagnetic signal intensity reaches the preset threshold, determining that the AUV is in an effective sensing region around the subsea cable; then finishing the initial Z-shaped searching task; and activating the electromagnetic locating of the subsea cable, and performing AUV motion guidance and autonomous control based on relative locating results, so that the AUV continuously tracks the route of the subsea cable; in AUV tracking process, when the electromagnetic signal intensity of the subsea cable is lower than the preset threshold, recording location information of the AUV in lost point of the subsea cable, interrupting the subsea cable tracking detection task, and conducting another local small-scale searching process of the subsea cable; when a sampled electromagnetic signal intensity reaches the preset threshold value again, finishing the local small-scale searching process of the subsea cable, and restarting the subsea cable tracking detection task; during the execution of the above tasks, when a navigation distance limit or navigation time limit corresponding to a specific task is met, terminating a current task and terminating autonomous detection operation;

wherein primary cable searching in the wide range comprises following specific steps:

a) determining whether the electromagnetic signal intensity fed back by an electromagnetic detection sensor carried by the AUV exceeding the preset threshold and whether a tracking flag is 0 or not; wherein an electromagnetic signal intensity threshold is selected to ensure that the detected signal exceeds a threshold value in the effective sensing region around the subsea cable; when the electromagnetic signal intensity is less than the preset threshold and the tracking flag is 0, it indicates that the AUV has not detected the effective electromagnetic signal of the subsea cable since being launched in the water, then the primary cable searching in the wide range is activated; when the detected electromagnetic signal intensity exceeds the preset threshold, or the tracking flag is 1, the primary searching process is terminated, then the AUV enters a cable tracking process or the secondary cable searching, then the electromagnetic signal intensity is re-compared; when the detected electromagnetic signal intensity exceeds the preset threshold, then the AUV enters the locating and tracking detection processes; when the detected electromagnetic signal intensity is less than the preset threshold, it indicates that the effective sensing region had been reached or the locating and tracking detection of the subsea cable had been implemented, then the secondary searching for the electromagnetic signal of the subsea cable is performed;

b) in the process of the primary cable searching in the wide range, calculating the distance between the current location of the AUV and a target waypoint on a straight searching route; wherein when the distance is greater than a preset receiving circle threshold, it is determined that the AUV has not reached a vicinity of the target waypoint and continues to perform a searching task with fixed-height and fixed-direction; when the distance is less than the circle threshold, it is determined that the AUV has reached the vicinity of the target waypoint, and a next searching route is planned and tracked; when planning the next searching route, the current location of the AUV is taken as an initial point of the straight searching route; when the target waypoint is a preset route waypoint 1, a preset waypoint 2 is used as the new target waypoint on next straight searching route; when the target waypoint is not the preset waypoint 1, then the target waypoint on the straight searching route is planned with a Z-shaped sailing method;

c) in the Z-shaped sailing method, determining the Z-shaped searching route with the preset route length $L_1$ and route angle $\theta_1$, wherein the target waypoint on the Z-shaped searching route is planned as follows:

$$O_{i+1}=(N_{O_{zi}}+L_1\cos(\psi\pm\theta_1), E_{O_{zi}}+L_1\sin\psi\pm\theta_1),$$

wherein $(N_{O_{zi}}, E_{O_{zi}})$ are coordinates of the current location of the AUV in an NED (north, east, down) coordinate system, $\psi$ an angle of the route where the AUV is located currently; the formula represents that when the AUV reaches the target waypoint, a desired route angle changes to the right or to the left alternately, so as to form a Z-shaped searching area and cover a potential subsea cable position; the calculation of $(N_{O_{zi}}, E_{O_{zi}})$ is given as follows:

$$(N_{O_{zi}}, E_{O_{zi}})=(N(N_i-N_{ori}), N(E_i-E_{ori})\cos N_{ori}),$$

wherein $(N_{ori}, E_{ori})$ is latitude and longitude coordinates of launching location of the AUV, $(N_i, E_i)$ is the current latitude and longitude coordinates of the AUV, and the variable N is expressed as follows:

$$N = \frac{L_{long}}{\sqrt{1-\frac{L_{long}^2-L_{short}^2}{L_{long}^2}(\sin N_{ori})^2}},$$

where, $L_{long} \approx 6378137.0$ is the length of the earth's long semi-axis, and $L_{short} \approx 6356752.0$ is the length of the earth's short semi-axis.

2. The integrated detection method of subsea cable electromagnetic searching, locating and tracking according to claim 1, wherein parameters for the planning subsea cable detection task mainly include: latitude and longitude of a waypoint 1 $O_1(N_1, E_1)$, latitude and longitude of a waypoint 2 $O_2(N_2, E_2)$, a detection sailing time threshold $t_{tol,sum}$, a detection sailing distance threshold $d_{tol,sum}$, an electromagnetic signal intensity threshold $B_{val}$, a target waypoint receiving circle threshold $d_{acp}$, a primary Z-shaped searching route length $L_1$, a Z-shaped route angle $\theta_1$, a primary maximum allowable searching range $d_{alo,1}$, a secondary maximum allowable searching range $d_{alo,2}$, a secondary Z-shaped searching route length $L_2$, and a Z-shaped route angle $\theta_2$; wherein a) a principle of selecting parameters for the task planning: the waypoints 1 and 2 are set in a host computer according to an approximate route and direction recorded in subsea cable laying log, ensuring that the two waypoints $O_1$ and $O_2$ are located on both sides of the subsea cable and that their connection lines are basically perpendicular to target cable direction; the detection sailing time threshold and the detection sailing distance threshold are a total time and a total distance of overall detection task, and the distance is ensured to be $d_{tol,sum} > d_{alo,1} > d_{alo,2}$ o ensure a larger search area for a primary cable searching; in processes of the primary cable searching and secondary cable searching for the electromagnetic signal, a search time threshold is set simultaneously; the target waypoint receiving circle threshold $d_{acp}$ indicates that the AUV is considered to have reached a target waypoint when a distance between the AUV and the target waypoint is less than this value; for Z-shaped cable searching process, since the primary cable searching generally suffers more uncertainty by comparing with the secondary search again, the parameters is selected to ensure that $L_1 > L_2$ and $\theta_1$, $\theta_2 \approx 150°$.

3. The integrated detection method of subsea cable electromagnetic searching, locating and tracking according to claim 1, wherein the secondary cable searching will be activated in local small range when a subsea cable electromagnetic signal is lost; a detailed procedure can be summarized as follows:

a) in the process of tracking detection for the subsea cable, when the detected electromagnetic signal intensity is lower than the preset threshold, activating the secondary cable searching; when the AUV enters secondary searching process for the first time, a cable tracking lost flag is 0, and subsea cable information at lost location is recorded, which includes the current location of the AUV, a detected subsea cable routing angle and the water depth; then the cable tracking lost flag will be set as 1; when the AUV enters the secondary searching process repeatedly, a location of a previous lost point is maintained since the cable tracking lost flag is set as 1;

b) the latitude and longitude coordinates of the lost point are converted to XY coordinates, a distance between the AUV and the lost point of the subsea cable is calculated; then whether the distance between the AUV and the lost point exceeds a preset secondary maximum allowable searching range $d_{alo,2}$ or not is judged; when the distance exceeds the secondary maximum allowable searching range, it is determined that the subsea cable tracking is lost, and the current cable tracking and detection task is terminated; when the distance from the lost point is less than the secondary maximum allowable searching range, then the secondary searching in the local small range is performed; the secondary cable searching adopts the Z-shaped sailing, and the basic principle of that is the same as that of the primary cable searching in the wide range, except that the Z-shaped searching route length L in the secondary cable searching is smaller than the same of that in the primary cable searching, and the Z-shaped route angle $\theta$ in the secondary searching is larger than the same of that in the primary cable searching, so that the secondary sailing searching is performed only within the local small range.

4. The integrated detection method of subsea cable electromagnetic searching, locating and tracking according to claim 1, wherein a relative locating algorithm is designed based on an electromagnetic filed radiated by a target subsea cable; when the AUV is located in the effective sensing region of electromagnetic signal, it locates a heading deviation $\psi_{e,detect}$, lateral offset $Y_e$ in horizontal profile and vertical offset $Z_e$ in vertical profile between the AUV and the subsea cable based on electromagnetic detection sensors on board the AUV; then based on the above locating results, autonomous tracking detection for subsea cables is carried out.

5. The integrated detection method of subsea cable electromagnetic searching, locating and tracking according to claim 1, wherein an AUV tracking detection algorithm is designed based on an electromagnetic locating result of the subsea cable; in detail, an electromagnetic signal-guided autonomous AUV tracking detection to subsea cable is achieved based on the locating results of the subsea cable;

a guidance law for the AUV to track the subsea cable in horizontal and vertical profiles is designed based on the electromagnetic locating results:

$$\begin{cases} \psi_{LOS} = \tan^{-1}\left(\frac{-Y_e}{k_y l}\right) \\ \theta_{LOS} = \tan^{-1}\left(\frac{Z - Z_d}{k_z l}\right) \end{cases},$$

wherein $Y_e$ is lateral offset between the AUV and the subsea cable, Z is the vertical height of the AUV related to a seabed which is measured with AUV-boarded altimeter in real-time, $Z_d$ is an expected tracking height above the seabed, l is a length of the AUV, $k_y$ and $k_z$ are guidance constants;

based on the guidance law in the horizontal and vertical profiles, a deviation of heading angle and pitch angle of the AUV is designed as follows:

$$\begin{cases} \psi_e = \psi_{e,detect} + \beta + \psi \\ \theta_e = \theta - \alpha \end{cases},$$

wherein $\psi_{e,detect}$ is the detected angle between the AUV heading and the subsea cable, $\psi$ and $\theta$ are the heading angle and the pitch angle of the AUV respectively, and a sideslip angle $\beta$ and an angle of attack $\alpha$ are given as follows:

$$\begin{cases} \beta = \tan^{-1}\left(\frac{v}{u}\right) \\ \alpha = \tan^{-1}\left(\frac{-w}{u}\right) \end{cases},$$

wherein u, v, and w are surge speed, sway speed and heave speed of the AUV respectively; with above locating results and guidance laws, a backstepping motion controller for AUV in horizontal and vertical profiles are designed as:

$$\begin{cases} \tau_r = -(m_{11} - m_{22})uv + d_{66}r + m_{66}\left(K_{pr}e_r + K_{ir}\int_0^t e_r d\tau + K_{dr}\dot{e}_r\right) \\ \tau_q = -(m_{33} - m_{11})uw + d_{55}q + m_{55}\left(K_{pq}e_q + K_{iq}\int_0^t e_q d\tau + K_{dq}\dot{e}_q\right) \end{cases}, \quad 5$$

wherein $m_{11}$, $m_{22}$, $m_{33}$, $m_{55}$, and $m_{66}$ are hydrodynamic parameters of the AUV in surge, sway, heave, pitch and yaw directions respectively; $d_{55}$ and $d_{66}$ are hydrodynamic damping parameters of the AUV in pitch and yaw directions respectively; $K_{pr}$, $K_{ir}$, $K_{dr}$ and $K_{pq}$, $K_{iq}$, $K_{dq}$ are motion control parameters of the AUV on the horizontal and vertical profiles respectively; $\tau_r$ and $\tau_q$ are control inputs in horizontal and vertical profiles respectively; control errors $e_r$ and $e_q$ of the heading and pitch directions are expresses as follows:

$$\begin{cases} e_r = r - r_d \\ e_q = q - q_d \end{cases},$$

wherein r and q are real-time yaw and pitch angular speeds respectively, $r_d$ and $q_d$ are expected yaw and pitch angular speeds respectively, which are designed as follows:

$$\begin{cases} r_d = \dot{\psi}_{LOS} - k_\psi(\psi_e - \psi_{LOS}) - UY_e\dfrac{\sin\psi_e - \sin\psi_{LOS}}{\psi_e - \psi_{LOS}} - \dot{\beta} \\ q_d = \dot{\theta}_{LOS} - k_\theta(\theta_e - \theta_{LOS}) - U(Z - Z_d)\dfrac{\sin\theta_e - \sin\theta_{LOS}}{\theta_e - \theta_{LOS}} - \dot{\alpha} \end{cases},$$

where U is the resultant speed of the AUV; $k_\psi$ and $k_\theta$ are non-negative control parameters.

6. The integrated detection method of subsea cable electromagnetic search, locating and tracking according to claim 1, wherein characterized in the control of the operating time, in each control cycle, first a distance between current position and launching location of the AUV is calculated, and total sailing time after being launched into the water is calculated, the total sailing time and sailing distance of all processes, including searching for signals from the subsea cable, tracking and detecting, and secondary searching, are constrained to ensure that the AUV completes cable detection tasks and rise to surfaces within a limited time; constraining the sailing distance and sailing time of the primary and secondary signal search process, so that the AUV performs cable searching task in a limited period of time to prevent the AUV from sailing and searching for a long time without the electromagnetic signal of the subsea cable, and to even avoid loss of AUV.

* * * * *